US006494321B1

United States Patent
Sadow et al.

(10) Patent No.: US 6,494,321 B1
(45) Date of Patent: *Dec. 17, 2002

(54) SECUREMENT OF PORTABLE ELECTRONIC EQUIPMENT IN CARRYING CASE

(75) Inventors: Bernard D. Sadow, Chappaqua, NY (US); Harriet Sadow, Chappaqua, NY (US)

(73) Assignee: Outrigger, Inc., Chappaqua, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 09/659,292

(22) Filed: Sep. 12, 2000

Related U.S. Application Data

(63) Continuation-in-part of application No. 09/307,339, filed on May 3, 1999, now Pat. No. 6,116,418.

(51) Int. Cl.$^7$ ................................................. B65D 3/02
(52) U.S. Cl. ....................... 206/320; 206/305; 206/579; 206/460
(58) Field of Search ................................ 206/305, 320, 206/579, 460; 150/113; 190/110; 383/86; 248/205.2

(56) References Cited

U.S. PATENT DOCUMENTS

| 5,238,106 A | * | 8/1993 | Nguyen et al. ............. 206/223 |
| 5,829,627 A | * | 11/1998 | Martindale .................. 220/666 |
| 6,116,418 A | * | 9/2000 | Sadow ........................ 206/320 |

* cited by examiner

Primary Examiner—Mickey Yu
Assistant Examiner—Troy Arnold
(74) Attorney, Agent, or Firm—Abelman, Frayne & Schwab

(57) ABSTRACT

A pair of complementary securement members are provided for securing an article of portable equipment, such as a laptop or palm held computer, within a portable carrying case. Since the thickness of the securement member attached to the base of the portable computer may interfere with the operation of non-slip frictional members which conventionally depend from the base of the portable computer, supplemental frictional members are provided in conjunction with the securement member. The supplemental frictional members project beyond the remaining portion of the securement member to engage a supporting surface (e.g., table or desk) when the portable computer is removed from its portable carrying case.

1 Claim, 3 Drawing Sheets

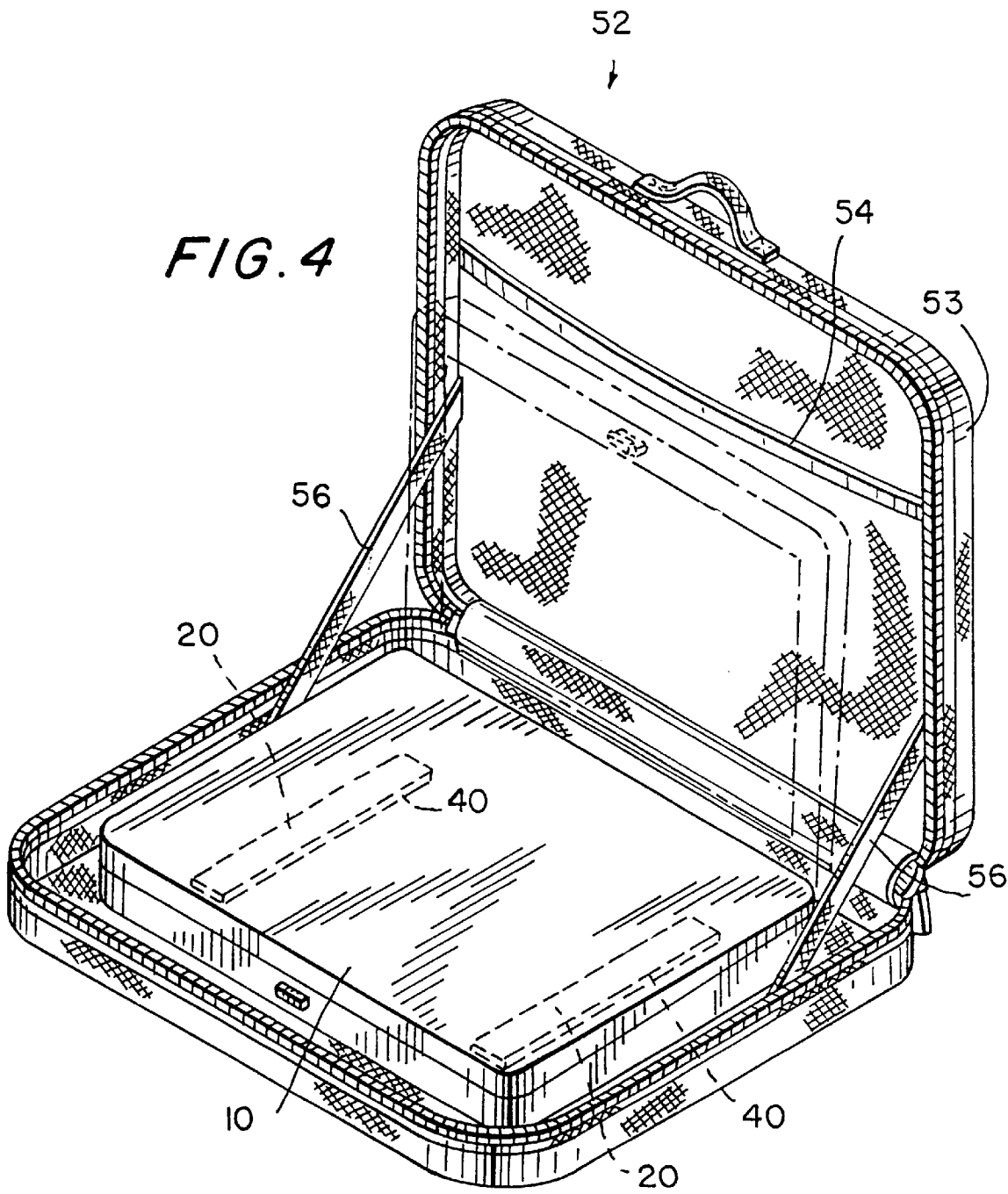

SECUREMENT OF PORTABLE ELECTRONIC EQUIPMENT IN CARRYING CASE

CROSS-REFERENCE TO RELATED APPLICATIONS

This application is a continuation-in-part of application Ser. No. 09/307,339, filed on May 3, 1999, now U.S. Pat. No. 6,116,418.

FIELD OF INVENTION

The present invention relates to the safe securement of an article of electronic equipment, such as a laptop or palm held computer, within a portable carrying case with securement members which also insure non-slip engagement with a supporting surface (e.g., desk or table) when the article of electronic equipment is removed from within its carrying case.

BACKGROUND OF INVENTION

Numerous constructions of portable carrying cases are known for the convenient transporting of small articles of electronic equipment, such as laptop computers or computers intended to be held within the palm of the user's hand. Typical of such constructions for laptop computers are the carrying cases shown in my U.S. Pat. Nos. 5,622,262; 5,755,329; and 5,819,942 as well as U.S. Pat. Nos. 5,445,266; 5,524,754; 5,762,170; and 5,857,568. In such carrying cases for laptop computers it is desirable to locate and maintain the laptop computer within an appropriate compartment, while safeguarding the computer against shock induced forces should the carrying case be accidentally dropped or hit. It is also desirable in many instances for the user to operate the laptop computer while it is still in the carrying case, and access thereto is provided by the opening of one of the panels of the carrying case. In those instances there is an increased possibility of the laptop computer falling out of the carrying case. Thus, the need arises to provide a simple means to locate and secure the laptop computer within its carrying case, particularly when the carrying case is open and the user is operating the laptop computer.

The laptop computer will typically include frictional feet along its base which are intended to engage a supporting surface (e.g., desk or table) when the laptop computer is removed from its carrying case. These frictional feet are usually of minimal length. Accordingly the arrangement for securing the laptop computer within its carrying case, particularly if retrofit added to an existing laptop computer, must not interfere with the frictional engagement of the removed laptop computer on the supporting surface. That is, should the base of the laptop computer be modified to insure securement within its carrying case, the modified base should still include frictional members to establish non-slip engagement with a supporting surface when the laptop computer is removed from its carrying case.

SUMMARY OF THE INVENTION

The present invention solves the above requirements in an extremely simple and cost-effective manner. A particularly advantageous feature of the present invention is that it can be retrofit added to existing portable computers to further enhance their securement within a carrying case. I provide a pair of complementary securement members, with one of the securement members being intended for attachment to the base of the laptop computer (or other article of portable electronic equipment) at a base securement location. A second of the pair of securement members is located within the volume of the carrying case at a carrying case securement location which will face the base securement location when the laptop computer is inserted within the carrying case. The securement members may typically include cooperating Velcro manual pressure activated members. One of such securement members will include hooks and the other of the securement members will include loops. As is well known, the manual engagement of the hooks and loops will connect the securement members. It has been experienced that the thickness of the securement member, containing either the hooks or loops, is oftentimes of a thickness comparable to, or greater than, the length of the frictional feet generally included on the bottom of present commercially available laptop computers. Hence, when such a securement member is attached to the base of the laptop computer it will extend beyond the surface of the base a distance comparable to, or greater than, the length of the frictional feet depending from the base of the laptop computer. This will naturally interfere with the subsequent operation of the frictional feet when the laptop computer is removed from its portable carrying case and placed on a supporting surface. Hence, according to the present invention the securement member which is intended to be attached to the base of the laptop computer includes supplemental frictional members that are of a length greater than the thickness of the remaining portion of the securement member. Hence such supplemental frictional members will project beyond the remaining portion of the securement member which will be attached to the base of the laptop computer. Accordingly, when the laptop computer is removed from the portable carrying case and placed on a desk or other supporting surface, these supplemental frictional members will provide the requisite non-slip engagement with the supporting surface, while also advantageously protecting the supporting surface from being scratched by the securement elements carried by the securement member.

In accordance with a preferred feature of the present invention, at least the securement member attached to the base of the laptop computer includes a self-adhesive backing so as to facilitate the user attaching same to the base of the laptop computer. The complementary securement member within the portable carrying case may also be secured by adhesive. If desired, that securement member may be permanently attached within the case, as by sewing. The complementary securement member which is to be attached to the base of the laptop computer would then be provided to the user in conjunction with his or her purchase of the portable carrying case. Thus, the user would retrofit the existing laptop computer to be compatible with the carrying case having the feature of the present invention.

Although illustrated in association with a laptop computer the present invention may likewise be utilized in conjunction with small computers which are intended to be held in the palm of the user's hand, and their associated carrying cases.

In accordance with a preferred embodiment of the present invention each of the securement members is generally rectangular in shape, and has equal areas of securement elements (e.g., hooks or loops) for engagement with each other. The supplemental frictional members, which will be carried by the securement member attached to the base of the laptop computer, are preferably located at regions of its securement member outwardly proximate of its securement area.

Accordingly, it is a primary object of the present invention to provide a pair of complementary securement members for securing an article of portable electronic equipment within a carrying case, which still provides for non-slip frictional engagement between the base of the equipment and a supporting surface when the equipment is removed from its carrying case.

A further object of the present invention is to provide such a pair of complementary securement members which have cooperating hook and loop engagement therebetween, and the securement member attached to the base of the laptop computer includes supplemental frictional members which are of a length greater than the remaining thickness of its securement member.

Yet a further object of the present invention is to provide such a pair of complementary securement members for securing an article of electronic equipment within a carrying case, in which at least the securement member that is attached to the base of the electronic equipment includes a self adhesive backing.

Yet another object of the present invention is to utilize such complementary securement members in conjunction with a portable laptop or palm held computer.

These as well as other objects of the present invention will become apparent upon a description of the following drawings.

BRIEF DESCRIPTION OF DRAWINGS

FIG. 1A is an enlarged detailed view of a portion of a securement member.

FIG. 1B is a side cross-sectional view of FIG. 1A taken along section lines 1B—1B.

FIG. 4 is a perspective view showing a modification of the carrying case which permits access to, and operation of, the portable computer while it is still within the carrying case.

DETAILED DESCRIPTION OF THE PREFERRED EMBODIMENTS

Figure 1:
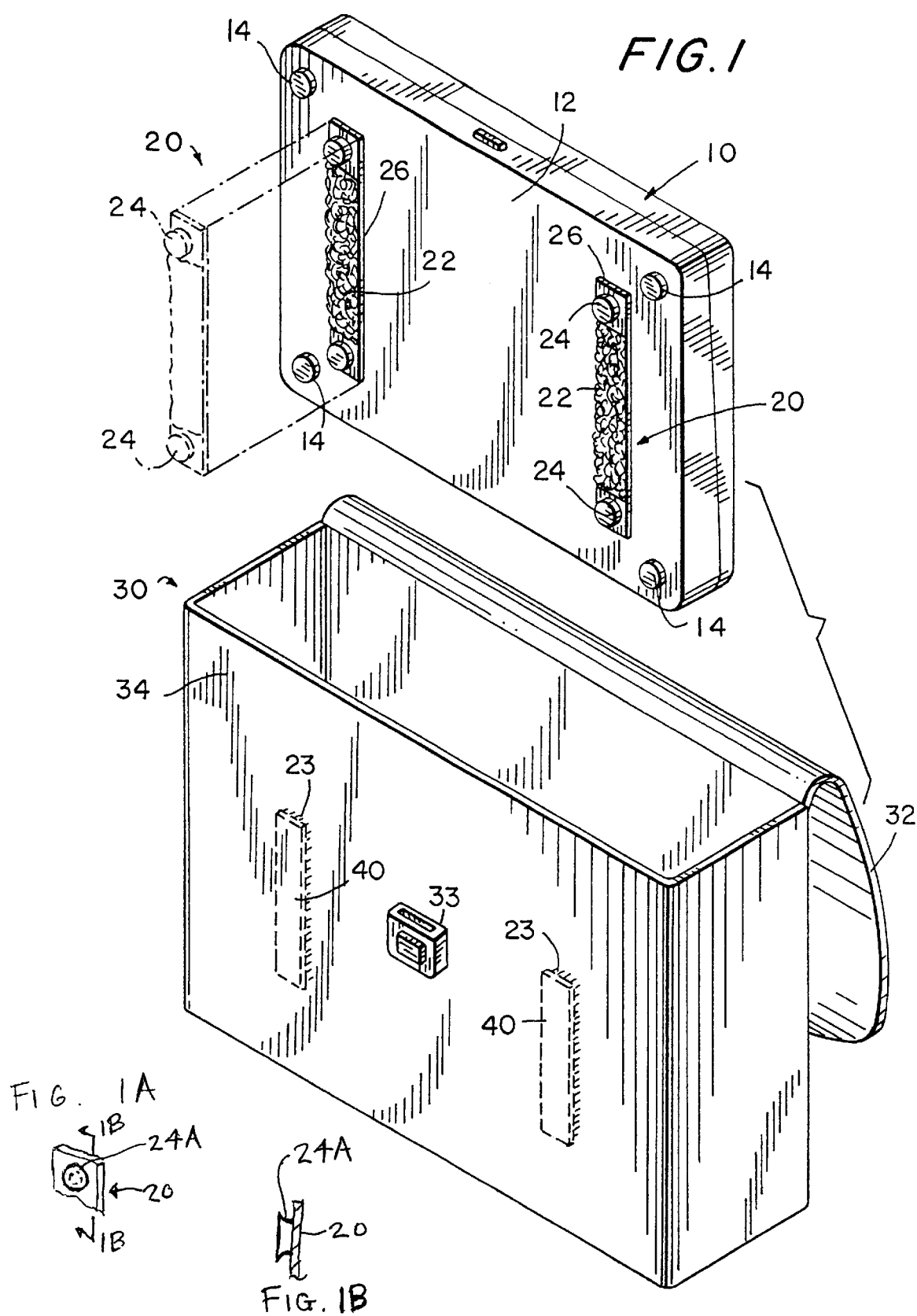
FIG. 1 is an exploded perspective view generally showing the intended placement of a laptop computer within a portable carrying case in accordance with the present invention.
Figure 2:
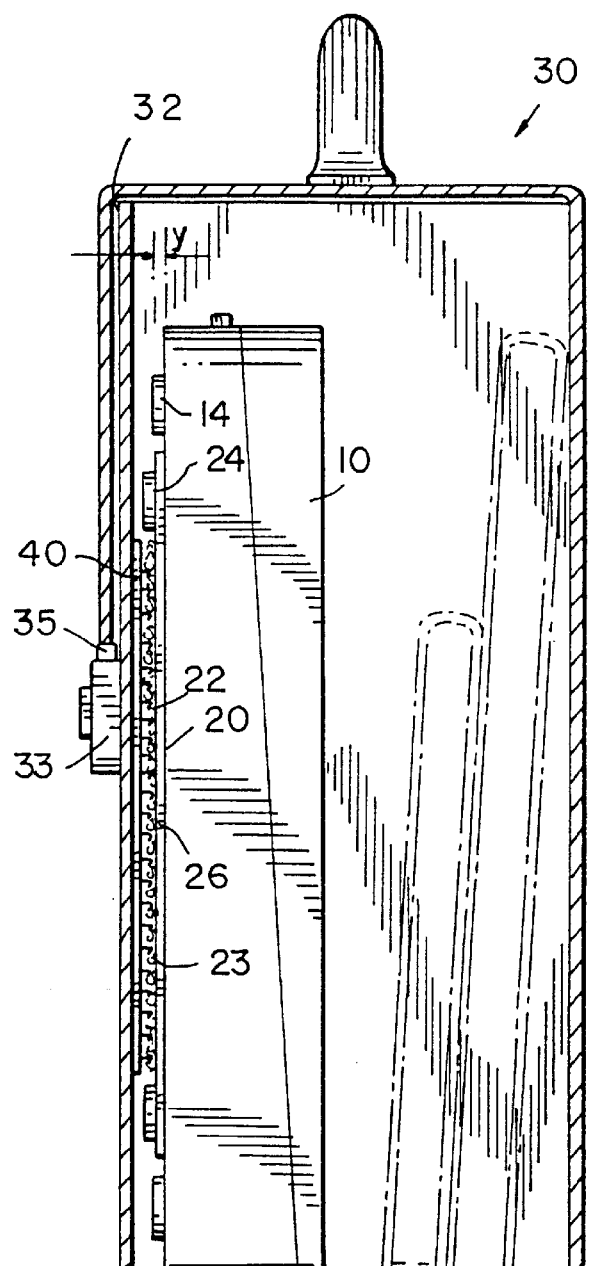
FIG. 2 is a cross sectional view showing the laptop computer inserted within its carrying case.
Figure 3:
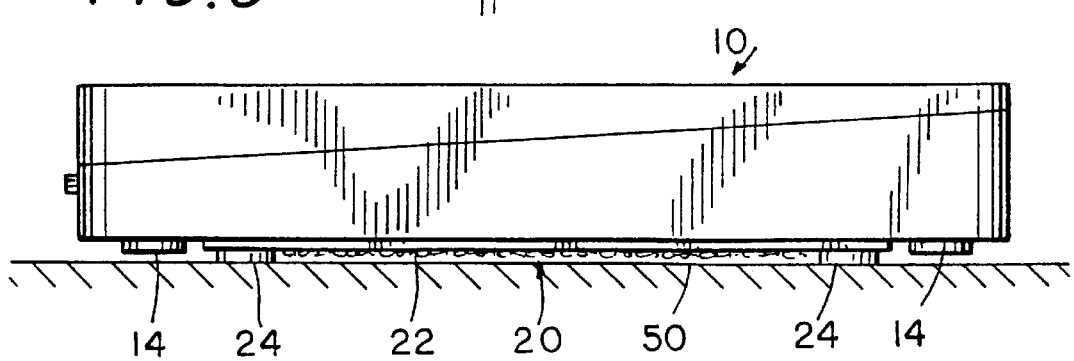
FIG. 3 is an end view showing a laptop computer removed from its carrying case and placed upon a supporting surface.

Reference is initially made to FIGS. 1–3. Laptop computer 10 is a typical type of well-known commercial unit which generally includes frictional feet 14 positioned about its base 12. Although frictional feet 14 are shown to be circular, other configurations are presently known, with the circular configuration being shown for illustrative purposes only. In order to provide for a slim overall appearance the length of the frictional feet, shown as X in FIG. 2, is usually relatively short. Frictional feet 14 are intended to provide for non slip engagement with a supporting surface (such as the table or desk 50 shown in FIG. 3) when the laptop computer 10 is removed from its carrying case 30.

Laptop computer 10 is intended to be inserted within portable carrying case 30. Portable carrying case 30 is generally illustrative of the numerous types of carrying cases designed for laptop computers, as typically represented by the above mentioned U.S. patents. The exterior walls of carrying case 30 are preferably formed of cushioning material, with the outer surface being formed of vinyl, leather, or other suitable material. The carrying case may also preferably include the air cushions (not shown) which are the subject of my aforementioned U.S. Pat. Nos. 5,622, 262; 5,755,329; or 5,819,942 to provide additional protection to the laptop computer in the event carrying case 30 is dropped.

In order to appropriately locate and prevent movement of the laptop computer 10 within the portion of the carrying case 30 intended for its reception, the present invention provides for a plurality of pairs of complementary securement members 20, 40. Securement members 20 are attached to the base 12 of the laptop computer, typically by a self-adhesive backing 26, although it should be recognized that other means of securement may be utilized. The complementary securement member 40 is attached to the interior of front wall 34 of the portable carrying case 30 at a securement location which will face the securement location of members 20 when laptop computer 10 is inserted within the portable carrying case 30 (see FIG. 2). The carrying case may also include a top closure flap 32, with a closure member 35 for engagement with complimentary member 33 on the exterior of front wall 34, for locking the portable carrying case.

The securement surfaces 22, 23 of the securement members 20, 40 may preferably comprise complementary Velcro pressure sensitive hook and loop fastener. The loops 22 may typically be on securement members 20 which are attached to the base 12 of the laptop computer, while the complementary hooks 23 will be on securement members 40 within the portable carrying case 30. Although this may be reversed, it is preferable to have the loops 22 on the base of the laptop computer 12 since they are softer, and less likely to scratch the supporting surface 50 when the laptop computer is taken out of the carrying case. Although pressure sensitive hook and loop fasteners are shown being utilized in conjunction with securement members 20 and 40, alternative means, such as snaps, could be employed.

Because of the usual short length of the frictional feet 14 secured to the base 12 of the laptop computer 10, when the securement members 20 are adhesively secured thereto, the individual securement elements 22 are apt to depend beyond the length of frictional feet 14. This would naturally interfere with the proper functioning of frictional feet 14 when the laptop computer is taken out of the portable carrying case 30 and placed on its supporting surface 50. To prevent this from happening, the present invention includes additional supplemental frictional members 24, which may typically be formed of plastic or rubber, which are secured to the end extremes of securement member 20 at regions outwardly proximate their securement area. Thus the supplemental frictional members project beyond the remaining portion of securement member 20, as shown by the distance Y in FIG. 2, compared to distance X, the latter being the length of the frictional members 14 which are permanently carried by the base 12 of the laptop computer.

Accordingly, it should be appreciated that when the laptop computer 10 is removed from the carrying case 30 and placed on the supporting surface 50, as shown in FIG. 3, the supplemental frictional members 24 will serve to effectively provide a non-slip engagement with the supporting surface 50.

Although supplemental frictional members 24 are shown to be circular similar to frictional feet 14, it can easily be understood that the supplemental frictional members can be suction cups 24A as well, (see FIGS. 1A and 1B).

Reference is now made to FIG. 4 which shows a modified carrying case 52 and which all those components corresponding to the ones discussed in FIGS. 1–3 are similarly numbered. Carrying case 52 differs from carrying case 30 in that it includes a top panel 53 which may be opened while the laptop computer 10 is within carrying case 52, so as to permit the user to access and operate the laptop computer while it is still within the carrying case 52. The carrying case may also include compartments 54 in top panel 53 for files or other materials, and side strap 56 to keep the lid open, as shown in FIG. 4. Since the carrying case 52 is now open, and there may not be any perimeter core wall around the laptop computer 10, there is a greater tendency of the laptop computer 10 to fall out of the carrying case 52. Thus this type of carrying case increases the further need for properly locating and securably maintaining the laptop computer 10 while it is within the carrying case, as advantageously provided by the complementary securement members 20, 40 of the present invention.

Although the present invention has been described in conjunction with preferred embodiments, it should naturally be understood that various modifications may be made thereto. For example when used in conjunction with a smaller hand held computer which may be confined to the user's hand, its associated personal handbag type of carrying case will include at least one securement member adapted to receive a complementary securement member on the base of that computer, which also includes supplemental frictional members which function when the computer is removed from its carrying case. Accordingly it is intended that the invention be defined by the scope of the following claim:

I claim:

1. In combination with an article of equipment having a plurality of frictional members on its base for non-slip contact with a supporting surface, and a carrying case for enclosing and transporting the article of equipment, at least one pair of complementary securement members for securing the article of equipment within the carrying case, a first of said pair of securement members for attachment to the base of the article of equipment at a base securement location, and a second of said pair of securement members for attachment within the volume of the carrying case, at a carrying case securement location facing said base securement location when the article of equipment is within the carrying case, said first securement member having a thickness sufficient to interfere with the non-slip contact between the plurality of frictional members on the base of the carrying case and a supporting surface, when said first securement member is attached to the base of the equipment, said first securement member including supplemental frictional members secured thereto, of a thickness greater than the thickness of the remaining portion of the first securement member, such that said supplemental frictional members project beyond said remaining portion when said first securement member is attached to the base of the equipment, and that said supplemental frictional member will establish non-slip engagement with a supporting surface, said supplemental frictional members comprising at least one suction cup.

* * * * *